Patented Jan. 2, 1945

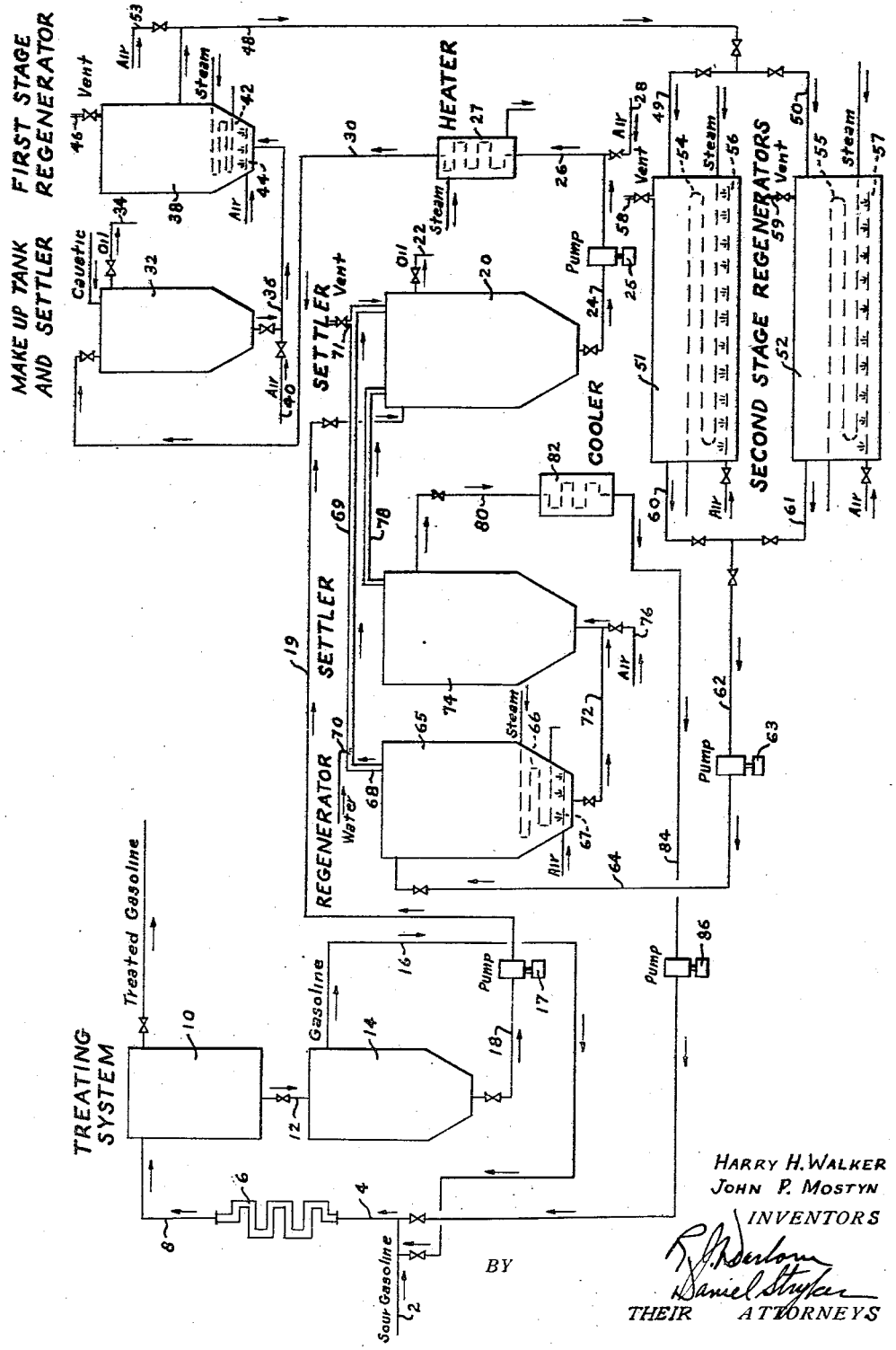

2,366,580

UNITED STATES PATENT OFFICE 2,366,580

REGENERATION OF DOCTOR SOLUTION

Harry H. Walker and John P. Mostyn, Lockport, Ill., assignors to The Texas Company, New York, N. Y., a corporation of Delaware Application January 26, 1942, Serial No. 428,218

5 Claims. (Cl. 196—148)

This invention relates to an improved process of sweetening hydrocarbon oils. More particularly the invention relates to a process of regenerating a spent doctor solution.

For sweetening sour hydrocarbon oils such as naphtha, kerosene or gasoline, the process most widely used is the so-called doctor process. In this process the sour oil is contacted with an alkaline solution of an alkali metal plumbite, usually a solution prepared by dissolving litharge in an aqueous solution of caustic soda. The process also usually involves treating the oil with free sulfur, which may be added before or after the addition of doctor solution. The over-all result of treating a sour oil in the above manner is to convert the mercaptans, which impart an unpleasant odor to the oil, to oil-soluble, odorless disulfides. In accomplishing this result the lead in the sodium plumbite is converted to insoluble lead sulfide which is settled out of the oil with the used doctor solution. Thus, while it is generally recognized that side reactions take place concurrently, the main reactions occurring in the doctor treatment are considered to be as follows:

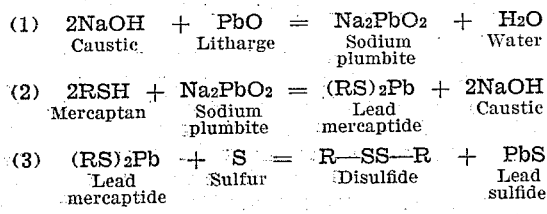

In the above equations the letter R represents the hydrocarbon radical of a mercaptan present in the sour oil.

In doctor treating it is customary to use an excess of doctor solution and, after the reaction, this solution is removed from the treated oil by settling, a plurality of settling tanks being used. Depending upon the tank system from which the used doctor solution is removed, it is more or less spent; i. e. sodium plumbite contained therein has been converted to lead sulfide. Thus a relatively completely spent doctor solution will be high in caustic soda content and will contain a large proportion of the lead in the form of lead sulfide. The spent doctor solution removed from the settling tanks also contains a proportion of the hydrocarbon oil which will vary in amount depending upon the temperature maintained and other factors involved in the treatment.

Since the litharge employed represents an important item of expense in the doctor treatment, it has been necessary to regenerate the spent doctor solution in order to make the process commercially feasible. This has been done by first treating the solution so as to remove the major portion of the oil contained therein. Where a large amount of the oil is in the solution the oil is usually present in emulsified form. This first separation has been accomplished by subjecting the solution to agitation and mild heating, and then settling to cause the solution to separate into an oil phase and an aqueous phase. The aqueous phase drawn off after this settling will contain some hydrocarbon oil.

After the separation of the major portion of the hydrocarbon oil, the doctor solution has been regenerated by flowing it through an open tank in which it is heated to an elevated temperature of the order of 195° F., and passing an oxygen-containing gas, such as air, through the solution to oxidize lead sulfide to lead oxide, which reacts with the caustic in the solution to form sodium plumbite. Although this procedure results in a regenerated doctor solution, the control is inexact, difficulties due to excessive foaming are present, and the hydrocarbon oil is not recovered.

It is a principal object of the present invention to provide an improved process of regenerating spent doctor solution whereby substantially complete regeneration of the solution may be assured, difficulties due to foaming may be avoided, and waste may be reduced.

Other objects of the invention in part will be obvious and in part will appear hereinafter.

In accordance with the present invention the regeneration of spent doctor solution is accomplished in a plurality of stages in which the temperature is progressively increased, the solution being subjected to the action of an oxidizing agent, preferably air or other oxygen-containing gas, in each stage. The temperature in each stage is adjusted so as to accomplish maximum regeneration while at the same time avoiding difficulties due to foaming. The rate of aeration is also controlled in accordance with these objectives. Evolved vapors are removed during the regeneration and the hydrocarbons contained therein may be recovered by condensing the vapors.

As a feature of the invention it has been found that the last stage of regeneration, which is conducted at the maximum temperature required, normally from 185° to 195° F., may be carried out effectively in a closed vessel from which evolved vapors are conducted through a conduit to a condensation system. Thus, the hydrocarbons in the vapors are condensed and recovered together with any entrained caustic that may be present. It has been found that the condensation and recovery of the vapors can be carried out efficiently by contacting the vapors with cool water; e. g. water at room temperature or in any event at a temperature below the boiling point of the hydrocarbons. This may be accomplished by spraying water into the vapors, or by passing the vapors into the lower portion of a vessel containing baffles, Raschig rings or other means for causing intimate contact of liquid and vapors, and flowing cool water downwardly through the rising vapors.

In either case there is obtained a mixed liquid of water and hydrocarbon oil. The mixed liquid may be treated separately to recover the hydrocarbon oil; by settling, for example. It is preferred, however, to conduct the mixed liquid back into the regeneration system prior to a settling step wherein the hydrocarbon oil is separated along with other oil present in the spent doctor solution. Thus, the vessel in which the final regeneration takes place is preferably connected with a settling vessel in the system prior to a regeneration stage by an elongated conduit or chamber into which the vapors pass and wherein they are contacted with a water spray. The condensed hydrocarbons in the vapors are thereby returned into the system and they are recovered simply and efficiently.

By proceeding in the manner described, the regeneration of the doctor solution is accomplished efficiently and the hydrocarbon loss is reduced. The process permits the use of relatively small equipment without difficulties due to foaming, for at the times when the solution contains a relatively large proportion of hydrocarbon oil the temperature is controlled to permit partial regeneration with lessened foam formation. Since the temperatures are gradually increased, in the early stages of regeneration hydrocarbon losses are small even where the vapors are not recovered, and in the final stage vigorous conditions may be maintained to complete regeneration and recover vaporized hydrocarbons.

In carrying out the process, it has been found to be advantageous to employ an aerating gas such as air itself in such manner as to aid in causing the flow of the solution through the system. Thus, a portion of the air may be introduced between definite regeneration zones in the direction of flow of the solution. In this way the aeration is continued during flow and the flow of the solution is facilitated.

In order that the invention may be understood more fully reference should be had to the accompanying drawing in which is shown a flow diagram illustrating one way in which the process may be carried out.

Referring to the drawing, the sour oil treated may be gasoline, naphtha, kerosene, etc., but the operation will be described in connection with the treatment of sour gasoline. The sour gasoline enters the system through line 2 at a rate of about 100 barrels per hour. From line 2 the gasoline passes into a line 4 wherein regenerated doctor solution is flowing as will be described later. The doctor solution is preferably adjusted so as to contain about 7 pounds of lead oxide and 30 pounds of sodium hydroxide per barrel of solution, and the solution is mixed with the sour gasoline in an amount corresponding to about 15 to 20 barrels of solution for each 100 barrels of gasoline. The mixed liquids then pass into a mixer 6 and then through line 8 into a conventional treating system diagrammatically illustrated at 10. This system may include agitators, means for introducing sulfur, and means for preliminary settling of the spent doctor solution. The spent doctor solution is removed from the system through line 12 leading to an initial settling vessel 14, which may be regarded as part of the treating system. In this vessel additional settling is accomplished, and the oil formed is removed through line 16 and is introduced into the sour charge entering the system.

The doctor solution is pumped by means of pump 17 through lines 18 and 19 to a settler 20. At this point, in normal operation, the temperature of the solution will be about 80° to 90° F. The settler 20 is preferably of large size and permits the separation of additional hydrocarbon oil which is removed through line 22 and is preferably subjected to distillation to remove tarry materials and produce a clean oil. From this settler the doctor solution is pumped through line 24 by means of pump 25 and through line 26 to a heater 27 where the temperature may be raised to about 130° F.

During the flow of the solution from the settler 20 to the heater, air is preferably injected into the solution through line 28, the rate of air injection, for example, being of the order of 50 cubic feet per minute. Thus, as the solution flows from the heater 27 through line 30 and into the make-up tank and settler 32, the regeneration of the solution may be initiated. The caustic soda that may be required for bringing the solution up to the desired caustic content may be introduced into this tank. Additional settling is accomplished here also and the oil separated may be removed through line 34 and the desirable fractions recovered by distillation. The doctor solution with reduced oil content is then passed through line 36 leading to a vessel 38 in which the first substantial amount of regeneration is accomplished. The flow of the solution through line 36 is aided and a part of the air required for regeneration is furnished by injecting air into line 36 through line 40. In this case the air may be injected at the rate of about 50 cubic feet per minute.

Vessel 38 is provided with a heating means such as a steam coil 42 and a means for injecting air such as spider 44. In this vessel the temperature of the solution may be raised to about 150° F. and air may be injected at the rate of about 70 cubic feet per minute. Under these conditions partial regeneration is accomplished without excessive foaming, and a small proportion of the low boiling hydrocarbons contained in the solution are vaporized and passed through vent pipe 46. These hydrocarbons may be recovered by condensation but in view of the relatively low temperature maintained, the recovery of the hydrocarbons is not essential for efficient operation of the process.

The partially regenerated doctor solution is removed through line 48 and then passes through line 49 or line 50 into one of two vessels 51 and 52 which are used alternatively and function as second stage regenerators. Air may be injected into the solution flowing in line 48, for example, at a rate of about fifty cubic feet per minute by means of line 53. The second stage regenerators are provided with steam coils 54 and 55 and means 56 and 57 for injecting air. In these vessels the temperature of the solution may be raised to about 175° F. and air may be injected at a rate of about 145 cubic feet per minute. The vapors formed are removed from the vessels through vent pipes 58 and 59 and may be recovered, but here also, since major evaporation of hydrocarbons is avoided due to the temperature maintained, the process may be operated efficiently without such recovery. The solution leaving either of vessels 51 or 52 passes through line 60 or line 61 into line 62 and is pumped by means of pump 63 through line 64 into a main regenerator 65. This regenerator is provided with a steam coil 66 and an air spider 67. By means of the steam coil the temperature of the solution is raised to about 185° to 200° F. Air is introduced at a rate of about 185 cubic feet per minute. Under these conditions the regeneration of the doctor solution is substantially completed. The doctor solution which is introduced into regenerator 65, due to the preceding settling and heating steps, will normally contain 4 to 8 per cent hydrocarbon oil. In this regenerator vapors are formed which contain valuable hydrocarbons and perhaps a small amount of entrained caustic.

To recover the vaporized hydrocarbons, regenerator 65 is closed to the atmosphere but is provided with an exit pipe 68 leading to an elongated horizontal pipe or chamber 69. There is disposed in the pipe 69 a means 70 for introducing a spray of cool water into the vapors. As shown, the pipe 69 leads to the settler 20 previously described, and the condensed hydrocarbons, together with the water introduced in the spray, pass into the settler where the hydrocarbons are separated along with the oil present in the incoming doctor solution, and are removed for treatment and recovery through line 22. The pipe 69 is provided with a vent 71 whereby the air and non-condensible vapors may escape from the system. It will be noted that by disposing the vent at this point, the flow of air assists in the movement of the condensed hydrocarbons and water to settler 20.

The substantially completely regenerated solution is removed from the bottom of regenerator 65 and passes through line 72 leading to a final settler 74. During its passage air is injected into line 72 through line 76 at a rate of, for example, 50 cubic feet per minute. This air serves to aid in moving the solution through pipe 72 and also functions to insure maximum regeneration. In settler 74 a small amount of remaining lead sludge and oil forms a narrow layer on top of the main body of the solution. Some of the oil contained in the solution entering this settler is vaporized and is passed through vapor line 78 into settler 20 where it condenses and is removed with the other oil from this vessel. The substantially clear and regenerated doctor solution is removed from settler 74 through line 80 and is cooled by means of cooler 82 to a temperature of about 80° to 90° F. and passes into line 84 leading to pump 86. This pump then pumps the solution into line 4 and into contact with the sour charge as previously described.

In the process illustrated lead sulphide recovered from the settlers forming part of the treating system, and make-up lead oxide may be introduced at various points. It has been found to be satisfactory to introduce these materials into either of the second stage regenerators. The lead sulphide recovered in the settlers is the more easily precipitated product, and this product and the lead oxide are added in amounts and when necessary to maintain the proper concentration of lead oxide in the finished solution.

It will be understood that the specific conditions of operation described in connection with the process shown in the drawing are merely illustrative of the invention and that the invention is not limited to operating in just this way. For example, there may be more or fewer stages of regeneration and the temperature maintained in the stages may be varied depending upon the particular equipment employed, the oil content of the spent doctor solution, and the foaming tendencies of the mixture. As pointed out above it is generally regarded as preferable to maintain a temperature in each stage approaching the maximum that can be maintained in the equipment employed and yet avoid excessive foaming. In general it may be stated that the regeneration is accomplished in a plurality of stages in which the temperature is progressively increased from about 150° F. to about 200° F., the particular temperature maintained in each stage being determined as described above.

As previously indicated, the particular method of treating the sour oil with the doctor solution forms no part of the present invention, and the doctor solution may be contacted with the sour oil in any desired proportion. For example, it has been proposed to contact sour gasoline with doctor solutions in proportions ranging from about 3 to about 20 barrels of doctor solution for each 100 barrels of sour gasoline.

Obviously many modifications and variations of the invention as hereinbefore described may be made without departing from the spirit and scope thereof, and therefore only such limitations should be imposed as are indicated in the appended claims.

We claim:

1. In the process of regenerating spent doctor solution containing hydrocarbon oil wherein an oxygen-containing gas is passed through the solution at regenerating temperatures, the improvement which comprises effecting substantial regeneration of the solution by the action of the oxygen-containing gas in each of a plurality of stages in which progressively higher regeneration temperatures of at least 150° F. are maintained, the amount of oxygen-containing gas employed in each stage being sufficient to accomplish substantial regeneration of the solution in that stage, and the last stage being carried out in a closed reaction zone from which vapors including hydrocarbons are removed and recovered by condensation.

2. The process of regenerating spent doctor solution and recovering hydrocarbons therefrom which comprises subjecting the doctor solution to a settling step to form a layer of hydrocarbon oil and a layer of aqueous doctor solution, recovering said hydrocarbon oil, effecting substantial regeneration of the aqueous doctor solution by the action of an oxygen-containing gas in each of a plurality of regeneration stages maintained at progressively increased regenerating temperatures of at least 150° F., the amount of oxygen-containing gas employed in each stage being sufficient to accomplish substantial regeneration of the solution in that stage, carrying out a stage a closed reaction zone, removing vapors including hydrocarbons from said zone, condensing hydrocarbons in said vapors by means of a water spray to form a mixed liquid comprising water and hydrocarbon oil, and returning the mixed liquid to the settling step wherein hydrocarbon oil is settled and recovered from the spent doctor solution, whereby hydrocarbons in the doctor solution subjected to the action of the oxygen-containing gas are recovered.

3. The process of regenerating spent doctor solution and recovering hydrocarbons therefrom which comprises subjecting the doctor solution to a settling step to form a layer or hydrocarbon oil and a layer of aqueous doctor solution, recovering said hydrocarbon oil, flowing the aqueous doctor solution through a plurality of regeneration stages maintained at progressively increased temperatures within the range from about 150° F. to about 200° F., passing air through the solution in each stage in an amount sufficient to accomplish substantial regeneration of the solution in that stage, carrying out a final stage at a temperature from about 185° F. to about 200° F. in a closed reaction zone, removing vapors including hydrocarbons from said zone, condensing hydrocarbons in said vapors by means of a water spray to form a mixed liquid comprising water and hydrocarbon oil, and returning the mixed liquid to the settling step wherein hydrocarbon oil is settled and recovered from the spent doctor solution, whereby hydrocarbons in the doctor solution entering the stage carried out in the closed reaction zone are recovered.

4. The process of regenerating spent doctor solution containing hydrocarbon oil which comprises contacting the solution with an oxygen-containing gas in at least three stages maintained at progressively higher regeneration temperatures ranging from about 150° to about 200° F., the amount of oxygen-containing gas contacted with the solution in each stage being sufficient to accomplish substantial regeneration of the solution in that stage, the temperature and amount of oxygen-containing gas employed in each stage being adjusted such that said substantial amount of regeneration is accomplished while avoiding excessive foaming and vaporization of hydrocarbons, and the last stage being carried out at a temperature within the range of about 185° to 200° F. and with the use of an amount of oxygen-containing gas effective to complete the regeneration of the doctor solution.

5. A process in accordance with claim 4 which comprises the additional step of injecting an oxygen-containing gas into the solution flowing between two stages to aid in regeneration and flow of the solution.

HARRY H. WALKER.
JOHN P. MOSTYN.